(12) United States Patent
Rogers et al.

(10) Patent No.: US 7,464,665 B1
(45) Date of Patent: Dec. 16, 2008

(54) DEVICE AND METHOD FOR CLIPPING THE CLAW NAILS OF AN ANIMAL

(76) Inventors: Anthony R. Rogers, 29 Friends La., Newtown, PA (US) 18940; Michael Waters, 904 Wills St., Delran, NJ (US) 08075

( * ) Notice: Subject to any disclaimer, the term of this patent is extended or adjusted under 35 U.S.C. 154(b) by 95 days.

(21) Appl. No.: 11/703,971

(22) Filed: Feb. 8, 2007

Related U.S. Application Data

(63) Continuation-in-part of application No. 10/803,346, filed on Mar. 19, 2004, now abandoned.

(51) Int. Cl.
*A01K 13/00* (2006.01)
(52) U.S. Cl. ...................................... 119/600
(58) Field of Classification Search ................ 132/200, 132/73, 735, 75.3, 75.4, 75.5; 30/26–29
See application file for complete search history.

(56) References Cited

U.S. PATENT DOCUMENTS 5,435,329 A * 7/1995 Heck et al. .................. 132/200
6,220,251 B1 * 4/2001 Jeong et al. ................. 132/73.5
6,553,592 B2 * 4/2003 Yang et al. ...................... 7/162
7,000,321 B1 * 2/2006 Rodgers ......................... 30/29
7,124,669 B1 * 10/2006 Rodgers ......................... 83/13
7,131,448 B2 * 11/2006 Lund et al. .................. 132/73.5
7,217,001 B2 * 5/2007 Vrsalovic et al. ........... 362/119

* cited by examiner

*Primary Examiner*—Thomas Price
(74) *Attorney, Agent, or Firm*—LaMorte & Associates

(57) ABSTRACT

A clipper assembly for clipping the claw nail of an animal and its associated method of use. The clipper assembly has a set of opposing cutting edges. The cutting edges are part of a clipping mechanism that selectively biases the cutting edges toward each other with enough force to cut an animal's claw nail. A light source is provided adjacent one of the cutting edges. The light source is oriented to shine light through a claw nail. The light has a frequency and intensity that enables some of the light to travel through the claw nail. As the light travels through the claw nail, it causes the features within the claw nail to come into contrast. The position of the blood vessels within the claw nail can therefore be observed. The claw nail can then be liberally clipped without cutting the blood vessels.

12 Claims, 5 Drawing Sheets

DEVICE AND METHOD FOR CLIPPING THE CLAW NAILS OF AN ANIMAL

RELATED APPLICATIONS

This application is a continuation-in-part of patent application Ser. No. 10/803,346, entitled Device And Method For Clipping The Claw Nails Of An Animal, filed Mar. 19, 2004 now abandoned.

BACKGROUND OF THE INVENTION

1. Field of the Invention

In general, the present invention relates to nail clippers for cutting nails. More particularly, the present invention relates to devices and methods for cutting the claw nails of animals.

2. Description of the Prior Art

Many different types of animals have claw nails. In nature, claw nails are used for defense, hunting, climbing and the like. Thus, long sharp claw nails are desirable over short dull claw nails. However, with domesticated animals, especially pets, long sharp claw nails present a problem. Pets with long, sharp claw nails can easily scratch their owners. Furthermore, pets, such as dogs and cats, can scratch furniture, wood floors and doors as they move about a home.

It is for these reasons that many pet owners cut the claw nails of their pets. By cutting and dulling the claw nails, the likelihood that the claw nail will scratch a person or an object is greatly reduced. However, the cutting of a claw nail on many animals is not a simple matter. Unlike humans, many animals have blood vessels and nerve endings within their nails. If the claw nail of such an animal is cut too short, the claw nail will bleed and will cause pain to the animal.

In the prior art, there are many different types of cutting devices that are used to cut the nails and hoofs of different animals. For instance, U.S. Pat. No. 4,228,585 to Nelson, entitled Animal Nail Clipper, shows a device that is designed to cut the claw nails of dogs and cats. However, with such prior art clipping devices, the amount of the claw nail that is cut away depends upon the experience of the person cutting the claw nail. If the person using the clipper cuts too much of the claw nail, the claw nail will bleed and will be painful for the animal.

The position of the blood capillaries and nerve endings in a claw nail varies greatly. As a result, in order to be sure they do not hurt an animal, many groomers are very conservative when they trim claw nails. This leaves the claw nail too long, wherein the claw nail can still cause scratching damage.

A need therefore exists in the art for a claw nail clipper that helps a user identify where the blood vessels and nerve endings lie within a claw nail. In this manner, a user can liberally cut down the size of the claw nail without causing pain or injury to the animal.

SUMMARY OF THE INVENTION

The present invention is a clipper assembly for clipping the claw nail of an animal and its associated method of use. The clipper assembly has a set of opposing cutting edges that can clip the claw nail of animals, such as dogs and cats. The cutting edges are part of a clipping mechanism that selectively biases the cutting edges toward each other with enough force to cut an animal's claw nail.

A light source is provided adjacent one of the cutting edges. The light source is oriented to shine light through a claw nail when the claw nail is placed between the opposing cutting edges. The light has a frequency and intensity that enables some of the light to travel through the claw nail. As the light travels through the claw nail, it causes the features within the claw nail to come into contrast. The position of the blood vessel within the claw nail can therefore be observed. The claw nail can then be liberally clipped without cutting the blood vessel or touching the nerve endings that surround the blood vessel.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be used to cut any type of elongated animal claw, such as bird talons, or reptile claws, it is particularly well suited for cutting the claw nail of a domesticated mammal, such as a dog. Accordingly, and by way of example, the present invention will be described in conjunction with a dog paw to illustrate the most likely application of the present invention.

Figure 1:
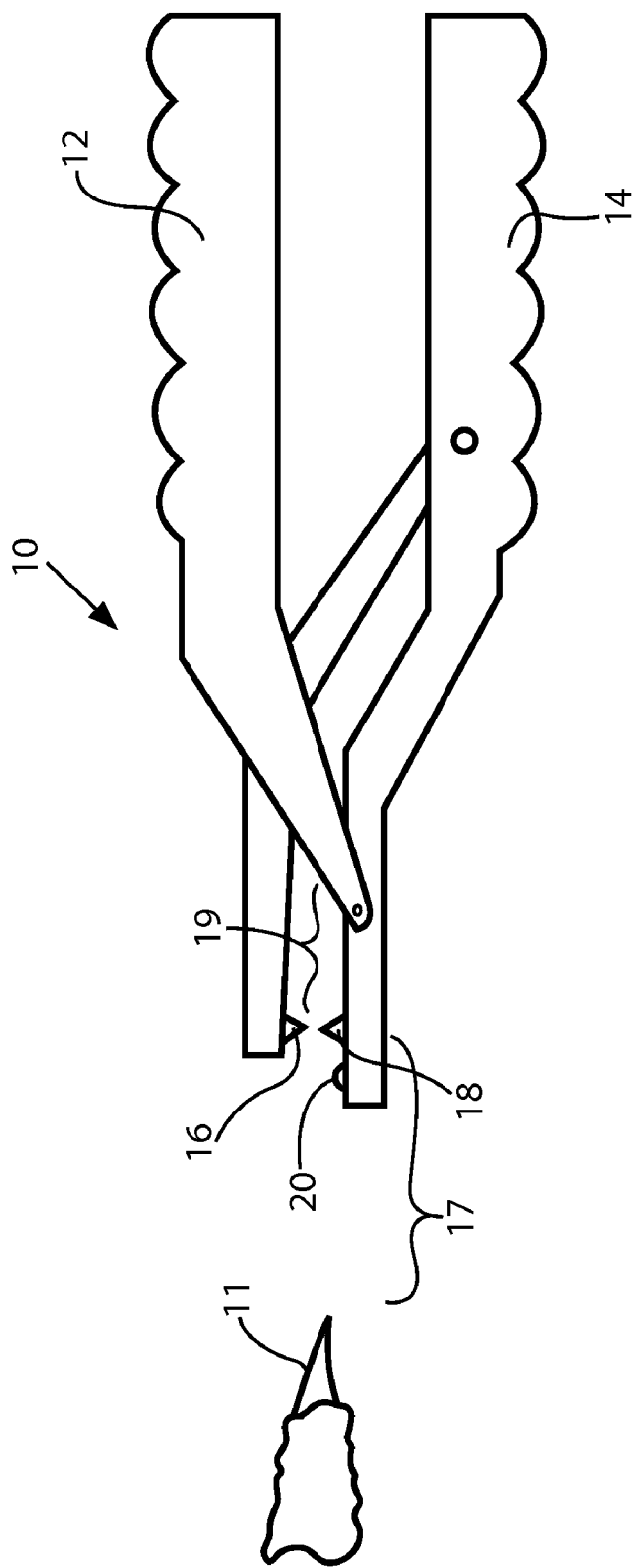
FIG. 1 is a front view of an exemplary embodiment of the present invention nail clipper assembly. Shown in conjunction with a dog's paw.

Referring to FIG. 1, an exemplary embodiment of the present invention clipper assembly 10 is shown. In this embodiment, the clipper assembly 10 is a manual tool having opposing handle elements 12, 14 that are manually squeezed together to operate the clipper assembly 10. At the front end of the clipper assembly 10 are a set of opposing cutting edges 16, 18. When the handle elements 12, 14 are squeezed together, the cutting edges 16, 18 are biased against each other, therein cutting any portion of a claw nail 11 that is placed between the cutting edges 16, 18.

There is a forward area 17 in front of the cutting edges 16, 18, and a rearward area 19 behind the cutting edges 16, 18. It will be understood that the claw nail 11 must be advanced through the forward area 17 in order for the claw nail 11 to reach the cutting edges 16, 18. Once the claw nail 11 is cut by the cutting edges 16, 18, the cut section of the claw nail 11 will be in the rearward area 19 behind the cutting edges 16, 18.

As will later be explained, there are many ways to configure a hand tool so that the movement of handles toward each other will cause a corresponding movement of cutting edges. The shown embodiment is only one possible configuration for the present invention. Other known cutting configurations, however, can be adapted for use within the scope of the present invention.

A dog's paw is shown in FIG. 1. The dog's paw has claw nails 11. Within each claw nail 11 are blood vessels and nerve endings that surround the blood vessels. However, the position of the blood vessels and nerve endings within each claw nail 11 cannot be ascertained by viewing the exterior of each claw nail 11.

To determine the location of blood vessels within a claw nail 11, the present invention clipper assembly 10 is equipped with a high-intensity light source 20. The light source 20 is located in the forward area 17 in front of the cutting edges 16, 18. It will therefore be understood that the claw nail 11 must pass the light source 20 prior to being contacted by the cutting edges 16, 18.

In the exemplary embodiment of FIG. 1, the light source 20 is positioned in front of the lower cutting edge 18 and is oriented to shine light upwardly. Thus, when a claw nail 11 is placed in between the cutting edges 16, 18, the claw nail 11 is positioned directly over the high intensity light source 20. Light from the high intensity light source 20 passes through the claw nail 11 and enables the user of the nail clipper assembly 10 to see the structure within the claw nail 11 including the position of blood vessels. The nail clipper assembly 10 can then be used to cut the claw nail 11 without cutting into the blood vessels or the nerve endings surrounding the blood vessels.

Figure 2:
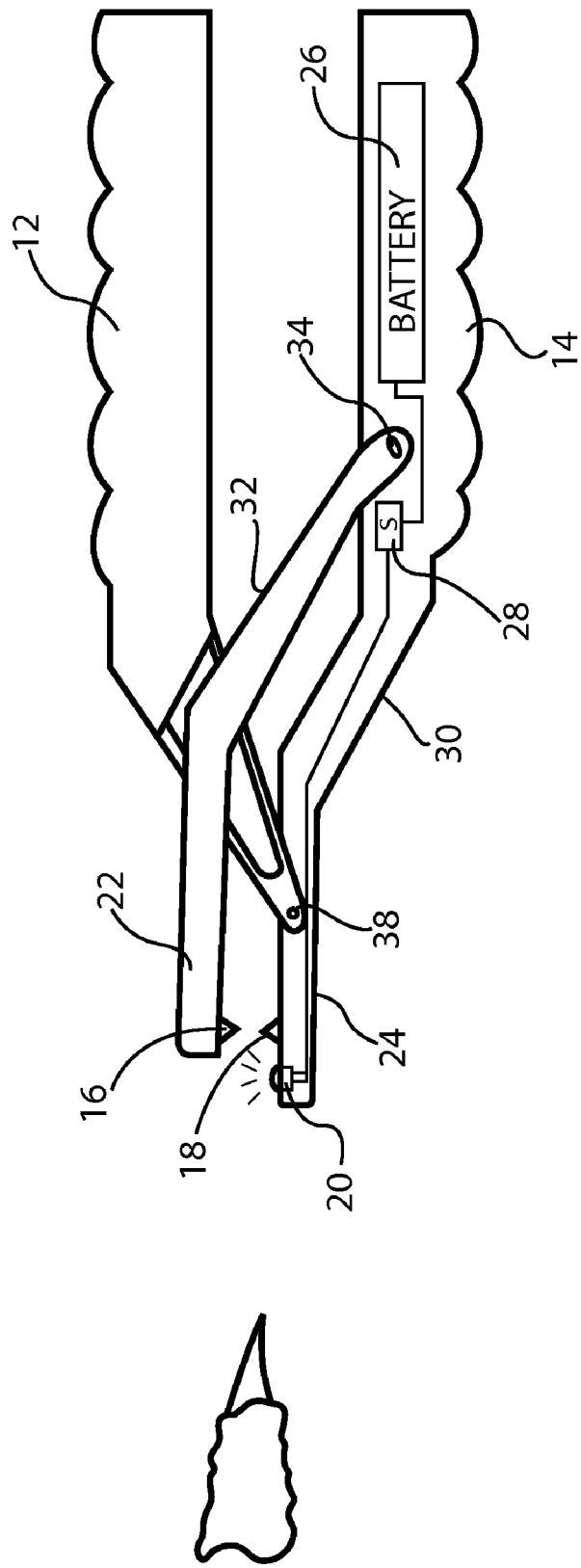
FIG. 2 is a cross-sectional view of the embodiment of the present invention nail clipper assembly shown in FIG. 1.

Referring to FIG. 2, the components comprising the present invention nail clipper assembly 10 are better shown. In the selected embodiment, there are two jaw elements 22, 24. Each of the jaw elements 22, 24 supports a cutting edge 16, 18. When the jaw elements 22, 24 are biased toward one another, the cutting edges 16, 18 meet and cut any portion of a claw nail 11 placed in between the cutting edges 16, 18.

A high-intensity light source 20 is disposed in the lower jaw element 24 immediately in front of the lower cutting edge 18. The lower jaw element 24 is made longer than the upper jaw element to accommodate the light source 20. The light source 20 is oriented to shine light upwardly away from the lower jaw element 24. The light source 20 is preferably at least one high-intensity light emitting diode (LED). The LED preferably emits light at or near the red frequencies of the visible spectrum. Such light frequencies pass best through a biomass. A bright red light will emit light that will pass through most any claw nail, including species and breeds that have black claw nails.

The upper jaw element 22 does not extend over the light source 20. As a consequence, a person using the nail clipper assembly 10 can look down over the top of the upper jaw element 22 and can directly view the light from the light source 20.

The light source 20 is powered by batteries 26 that are held in one of the handle elements 14. An activation switch 28 is disposed between the light source 20 and the batteries 26. The activation switch 28 is activated when the handle elements 12, 14 are initially pressed toward each other. The activation switch 28 is normally open and closes when the handle elements 12, 14 are pressed. Accordingly, the light source 20 is normally off and automatically turns on as soon as a person grabs the nail clipper assembly 10 and applies the smallest pressure to the handle elements 12, 14.

There are a great variety of hand tool configurations having opposing cutting edges that are manipulated by opposing handle elements. The most common configuration being the scissor or plier configuration. Any such prior art tool configuration can be adapted for use as part of the present invention nail clipper assembly 10. However, in the exemplary embodiment shown, a three part hand tool configuration is used. In the shown embodiment, there is a lower body structure 30. The lower body structure 30 has the lower jaw element 24 at one end and the lower handle element 14 at the opposite end. The lower body structure 30 holds the light source 20, the activation switch 28 and the batteries 26.

An upper body structure 32 is attached to the lower body structure 30 at a pivot connection 34. The upper body structure 32 terminates at one end with the upper jaw element 22. The upper body structure 32 is curved so that the upper jaw element 22 lay in a near parallel relationship to the lower jaw element 24.

An upper handle element 12 is provided that connects to the lower body structure 30 at a pivot connection 38. The upper handle element 12 passes over the upper body structure 32. When the upper handle element 12 is pressed toward the lower handle element 14, the top handle element 12 presses downwardly on the upper body structure 32. This causes the upper jaw element 22 to move toward the lower jaw element 24, thereby causing the upper and lower cutting edges 16, 18 to press against each other and cut.

Figure 4:
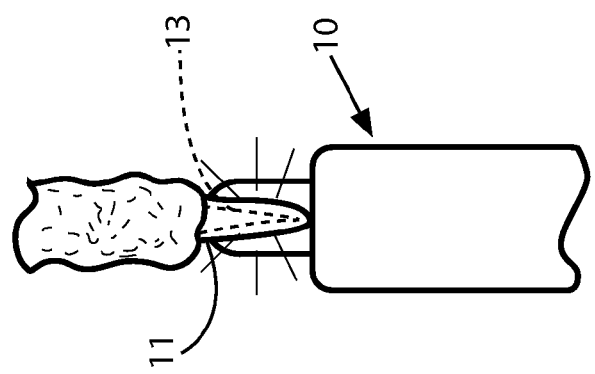
FIG. 4 is a top view of a dog's paw placed within the front end of the present invention nail clipper assembly.
Figure 3:
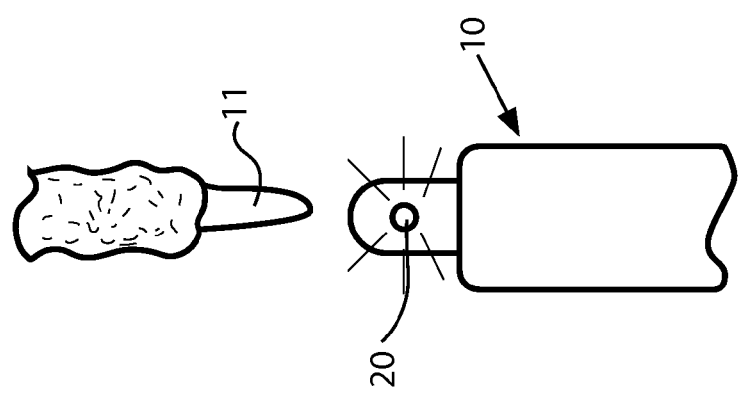
FIG. 3 is a fragmented top view of the front end of the present invention nail clipper assembly.

Referring to FIG. 3 and FIG. 4, it can be seen that when the front end of the nail clipper assembly 10 is viewed from above, the light source 20 can be seen. When a claw nail 11 is placed in the nail clipper assembly 10 and the light source 20 is activated, the light shines through the structure of the nail claw 11. This enables contrasts within the structure of the claw nail 11 to be observed. A person can therefore directly observe where the blood vessels 13 in the claw nail 11 are and where they are not. The claw nail 11 can then be placed in the nail clipper assembly 10 and positioned so that only the portions of the claw nail 11 that do not contain the blood vessels 13 are clipped. When the clipping is done, the nail clipper assembly 10 is set down and the light source 20 is automatically deactivated.

Figure 5:
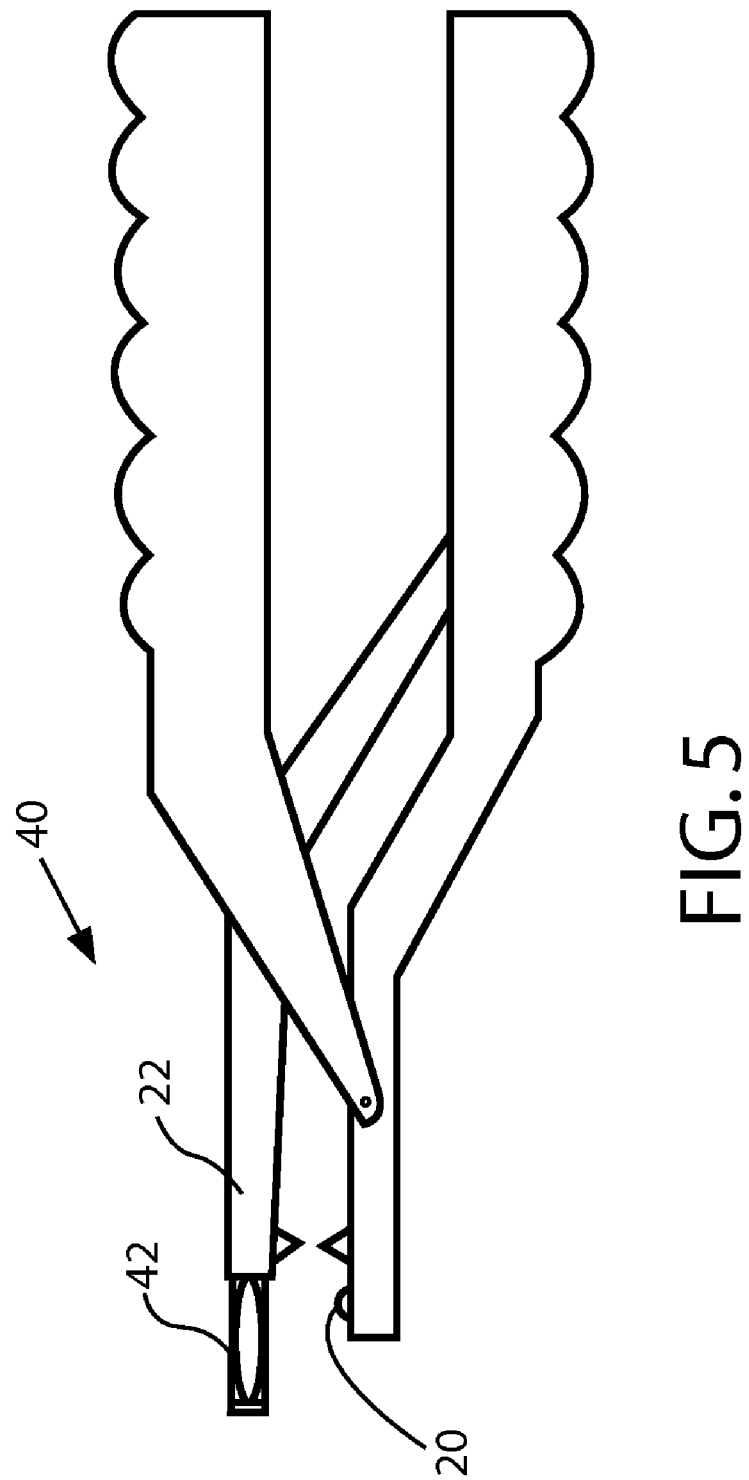
FIG. 5 is a side view of a first alternate embodiment of the present invention nail clipper assembly.

Referring to FIG. 5, an alternate embodiment of the present invention nail clipper assembly 40 is shown. In this embodiment, a magnifying lens 42 is attached to the upper jaw element 22 above the light source 20. The magnifying lens 42 magnifies any portion of an animal's claw nail that is placed into the nail clipper assembly 40 as the light from the light source 20 shines through that section of the claw nail. In this manner, blood vessels in small claw nails, such as cat claws, become much easier to see.

In the illustrated embodiments, the light source is attached to the lower jaw 24 (FIG. 2). It will be understood that the light source 20 need not be attached to the lower jaw. What is required is that the light source be located in the forward area in front of the cutting elements. In this manner, the light source can illuminate the internal anatomy of an animal's claw before, during and after the actual cut. Accordingly, it should be understood that the light source can be positioned to the side of the claw nail during cutting.

Figure 6:
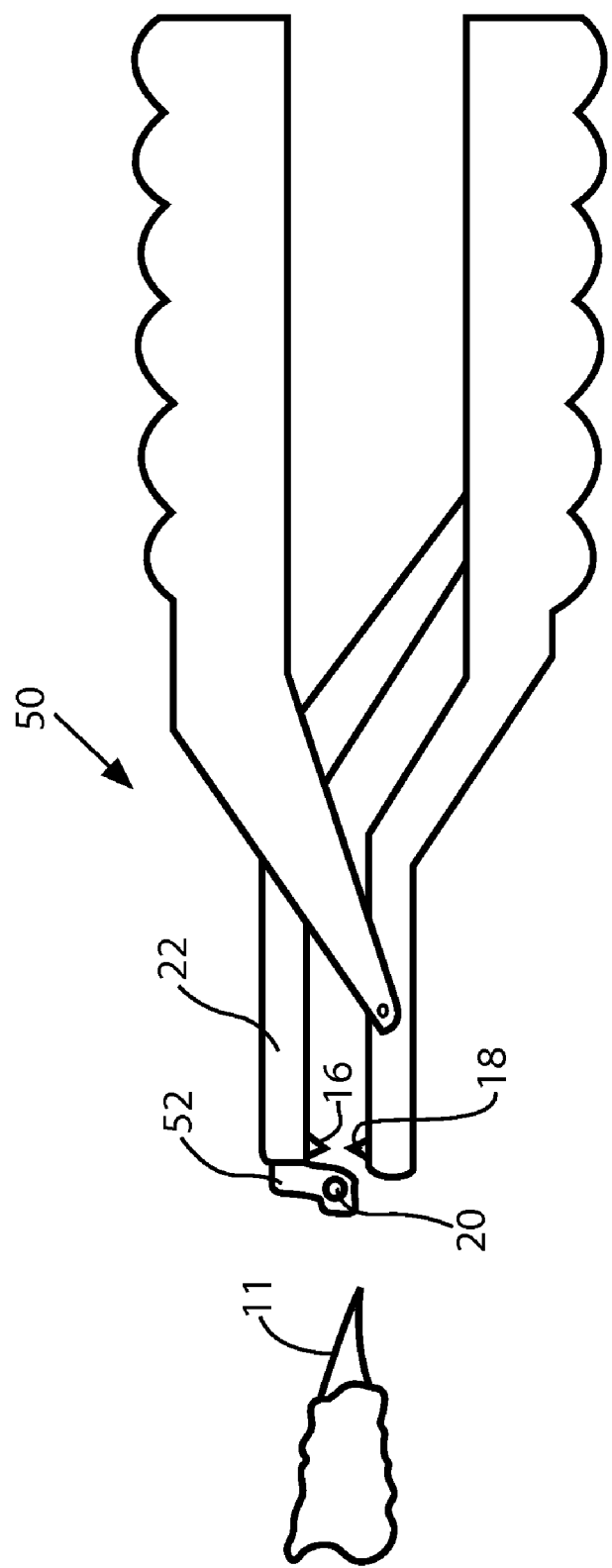
FIG. 6 is a side view of a first alternate embodiment of the present invention nail clipper assembly.

Referring to FIG. 6. an alternate embodiment of the present invention nail clipper assembly 50 is shown. In this embodiment, a bracket 52 extends off of the upper jaw element 22. The bracket 52 supports the light source 20. The light source 20 is held in the forward area 17 in front and to the side of the cutting edges 16, 18. In this manner, when a claw nail 11 is advanced through the forward area 17 toward the cutting edges 16, 18, it is illuminated from the sides. A sideways illumination also enables a person to see the internal anatomy of the claw nail 11 as the light from the light source 20 shines through that section of the claw nail.

It will be understood that the embodiments of the present invention nail clipper that have been described and illustrated are merely exemplary and that a person skilled in the art can make many variations to the shown designs. For example, there are many configurations that can be used to bias cutting edges of a clipper together. Any such configuration can be adapted for use as part of the present invention. What is important is that a light is provided that shines light through the claw nail, in front of the cutting elements, so that the position of the blood vessels in the claw nail can be observed prior to clipping. However, this can be done using many different configurations and light sources. All such alternate embodiments and variations are intended to be included in the present invention clipper assembly as described and claimed below.

What is claimed is:

1. The clipper assembly for clipping the claw nail of an animal, said assembly comprising:
   jaw elements that include an upper jaw element and a lower jaw element;
   a set of opposed cutting edges, that include an first cutting edge coupled to said upper jaw element and a second cutting edge coupled to said lower jaw element, wherein a forward area exists on said lower jaw element in front of said second cutting edge over which a claw nail must pass to reach said cutting edges;
   a mechanism for selectively biasing said cutting edges toward each other; and
   a light source disposed in said forward area of said lower jaw element, wherein said light source is oriented to shine light toward said upper jaw element and through any claw nail being cut by said cutting edges.

2. The assembly according to claim 1, wherein said light source emits red light.

3. The assembly according to claim 1, wherein said mechanism is a manually operated hand tool.

4. The assembly according to claim 3, further including batteries within said hand tool for powering said light source.

5. The assembly according to claim 3, wherein said hand tool includes opposing handle elements, wherein said cutting edges are biased toward each other when said opposing handle elements are biased toward each other.

6. The assembly according to claim 5, further including a switch for automatically activating said light source when said opposing handle elements are biased toward each other.

7. The assembly according to claim 1, further including a magnifying lens for observing a claw nail placed between said cutting edges.

8. A method of clipping a claw nail of an animal, comprising the steps of:
   providing a clipper having cutting edges for selectively cutting a claw nail, wherein said cutting edges include a lower cutting edge and an upper cutting edge, and wherein a forward area exists in front of said lower cutting edge over which a claw nail must pass to reach said cutting edges;
   providing a light source in said forward area that shine light upwardly away from said forward area in front of said cutting edges;
   positioning an area of said claw nail to be cut between said cutting edges;
   shining a light from said light source through the claw nail to make positions of blood vessels within the claw nail observable; and
   clipping at least one portion of the claw nail not containing a blood vessel using said cutting edges.

9. The method according to claim 8, wherein said step of providing a light source includes providing a light source that produces red light.

10. A method of determining the position of a blood vessel in a claw nail of an animal so that the claw nail can be safely clipped by a person using a clipper, said method comprising the steps of:
    providing a clipper having cutting edges and a forward area that extends in front of said cutting edges;
    providing a light source in said forward area that shines light in a line of sight toward the person using said clipper; and
    positioning the claw nail in said forward area, wherein said claw nail is positioned in said line of sight between said light source and the person using said clipper, therein obstructing the person using the clippers from directly observing said light source, wherein said light source shines light through the claw nail and exposes a position of a blood vessel within the claw nail to the person using said clipper.

11. The method according to claim 10, further including the step of clipping the claw nail while said light source shines light through the claw nail.

12. The method according to claim 10, wherein said light source shines red light.

* * * * *